A. JOHNSON.
BOTTLE CAP PADDING MACHINE.
APPLICATION FILED MAR. 24, 1913.

1,118,778.

Patented Nov. 24, 1914.
6 SHEETS—SHEET 1.

Fig. 1.

WITNESSES

INVENTOR
Aron Johnson
BY
ATTORNEYS

A. JOHNSON.
BOTTLE CAP PADDING MACHINE.
APPLICATION FILED MAR. 24, 1913.

1,118,778.

Patented Nov. 24, 1914.
6 SHEETS—SHEET 2.

Fig. 2.

WITNESSES

INVENTOR
Aron Johnson
BY 
ATTORNEYS

A. JOHNSON.
BOTTLE CAP PADDING MACHINE.
APPLICATION FILED MAR. 24, 1913.

1,118,778.

Patented Nov. 24, 1914.
6 SHEETS—SHEET 3.

Fig. 3.

WITNESSES

INVENTOR
Aron Johnson
BY
ATTORNEYS

A. JOHNSON.
BOTTLE CAP PADDING MACHINE.
APPLICATION FILED MAR. 24, 1913.

1,118,778.

Patented Nov. 24, 1914.
6 SHEETS—SHEET 6.

WITNESSES

INVENTOR
Aron Johnson
BY
ATTORNEYS

UNITED STATES PATENT OFFICE.

ARON JOHNSON, OF NEW YORK, N. Y.

BOTTLE-CAP-PADDING MACHINE.

1,118,778.

Specification of Letters Patent.

Patented Nov. 24, 1914.

Application filed March 24, 1913. Serial No. 756,409.

*To all whom it may concern:*

Be it known that I, ARON JOHNSON, a citizen of the United States, and a resident of the city of New York, borough of Brooklyn, in the county of Kings and State of New York, have invented a new and Improved Bottle-Cap-Padding Machine, of which the following is a full, clear, and exact description.
Among the principal objects which the present invention has in view are: To provide a machine to completely pad prepared caps by a continuous operation; to reduce the factor of manual labor attending the operation of padding caps of the character mentioned; to avoid injury to the adhesive member employed in the operation of padding; to avoid injury to the pad; to permit vapors or gases generated in the operation to escape; and to shorten the time of the operation.

One embodiment of the present invention is shown in the accompanying drawings, in which—
Fig. 3 is a side elevation partly cut away to show the interior construction, the view being taken as indicated by the arrow marked 3 in Fig. 2;
Fig. 11 is a detail view in sectional elevation, showing the reciprocating head and operative connection therefor to support the paper punch, pad-delivering plunger, and the registering pin for the supporting table.
Fig. 12 is a detail view in elevation, showing the means for relieving the strain on the connector bar when the same is arrested.

The particular operation for which the present invention is designed is that of mounting in the usual crimped metal cap provided as a stopper for bottles, a pad of suitable yielding material, such as cork.

Heretofore, the pads have been placed within the metal caps together with a disk of paper or other suitable material carrying as a vehicle a suitable cement or adhesive, employed to hold the pad to the cap. The pad, disk and cap have been assembled while cold. Subsequent to the assemblage, the parts have been crimped under pressure between heating members and there held while the cement or adhesive in the paper has been sufficiently softened to adhere to the pad and cap. Several objections have been inherent in the method and operation performed. Predominant among these objections are that, when performed by machinery, two distinct machines are necessary. As an incident of this, it is found necessary to handle the assembled caps and pads in transfer from one machine to the other, thereby increasing the feature of manual labor in the operation. Further, it has been found that when the paper is maintained under the heat required to melt the cement, the paper or cement is liable to be burned or otherwise damaged. The direct application of the heat to the cork, when the pad used is constructed from cork, is injurious as softening the bond, disintegrating thereby the cork. Also, it has been discovered that the continuous heat, when applied in the manner indicated, develops a vapor or steam which separates portions of the pad and the metal of the cap. The primary object of the present invention, as stated, is to avoid these objections. Therefore, the machine herein described is constructed primarily as a unit, or as a machine to perform a complete operation of padding the caps.

As seen in the accompanying drawings, the caps 21 are delivered from a feed table 22. The caps 21 are placed on the table 22 in inverted arrangement; that is, the hollow of each of the caps is upturned.

The caps are moved from the stationary table 22 to a rotary delivery table 23, and under a guide ring 24 superposed above said table. The guide ring 24 has a short interior annular flange 25, the edge of which approximates the upper surface of the table 23, and also a peripheral annular flange 26, which operates as a guard for the table 23 between the table 22 and the point of delivery of the successive caps 21 to the supporting table 27 (see Fig. 2 of the drawings). The guide ring 24 is a stationary member, and is fixedly secured to the table 22 and to a platform 28 by fasteners extending through lugs 29. The ring 24 is provided with a series of openings or slots 30, through which the caps 21 may be viewed while passing over the table 23.

The table 23 is mounted on a vertical shaft 31, on which is fixedly mounted a large bevel gear wheel 32. The bevel gear wheel 32 is meshed with a bevel pinion 33 on the main driving shaft 34 of the machine. The shaft 34 is continuously driven, preferably by a belt 35 when shifted to engage a pulley 36. The shaft 34 is operatively connected with both the delivery table 23 and the supporting table 27 to rotate both tables. The table 23 is rotated with a constant movement, while the table 27 has imparted thereto an intermittent motion.

Figure 2:
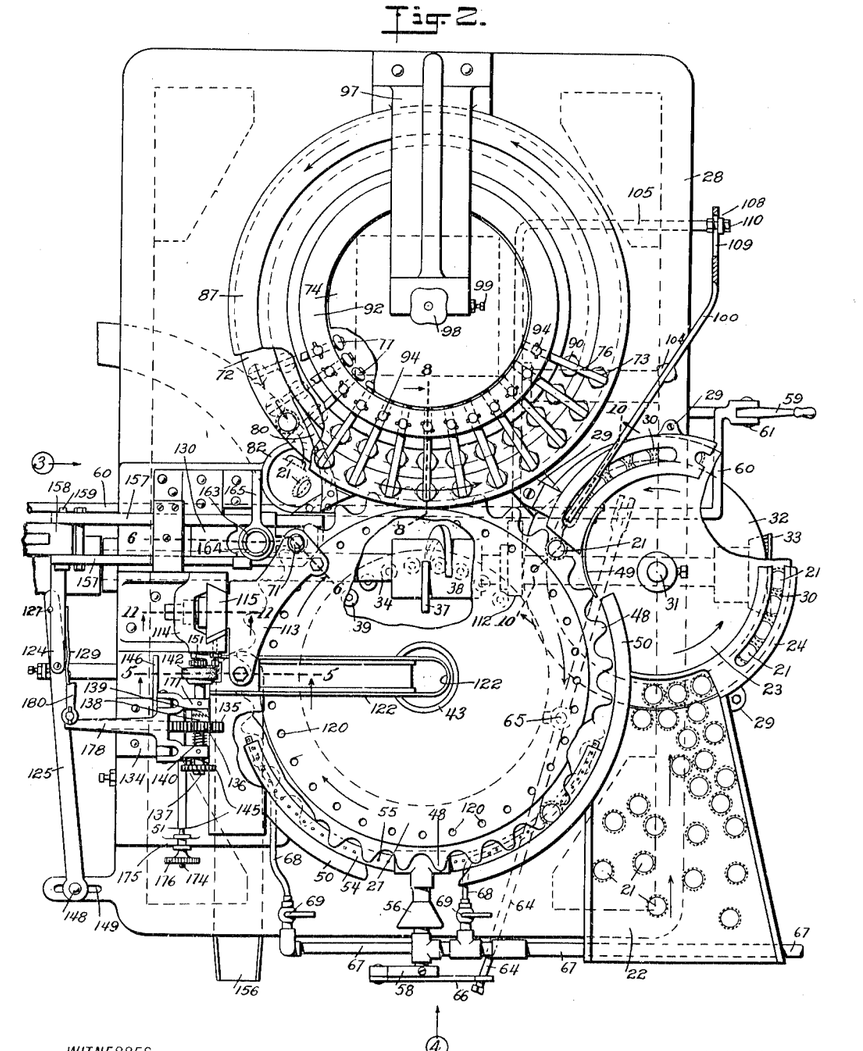
Fig. 2 is a top plan view of the machine, the driving pulleys and the end of the driving shaft supporting the same being omitted.

The intermittent motion imparted to the table 27 is effected by an irregular spiral flange 37, which is projected from a cylindrical hub 38 with which the shaft 34 is provided. The flange 37 is shaped substantially as shown in Fig. 2 of the drawings, to provide a straight section or a section in which the flange is extended perpendicular to the axis of the shaft 34 and a curved or spiral section. The lift of the spiral section of the flange 37 is equal to the distance between centers of pintle rollers 39. The rollers 39 are pivotally mounted on pins 40 projecting from the upper side of the disk 41, which disk is secured by a set screw 42 to the open-ended tubular shaft 43 upon the upper end of which the table 27 is mounted. The disk 41, as seen best in Figs. 3 and 4 of the drawings, extends below the shaft 34, the rollers 39 being projected into the path of the flange 37, to be engaged thereby to rotate the disk 41.

The hub 44 of the shaft 43 upon which the table 27 is mounted rests and has a bearing upon a thimble 45 suitably mounted on the bed plate 46 of the machine. In the arrangement of the tables 23 and 27, the latter extends above the former, the thinned edge 47 whereof rests in the path of the caps 21, so that the fingers 48 of said thinned edge engage said pockets successively and extend below the crimped edge of each of the caps 21.

Figure 1:
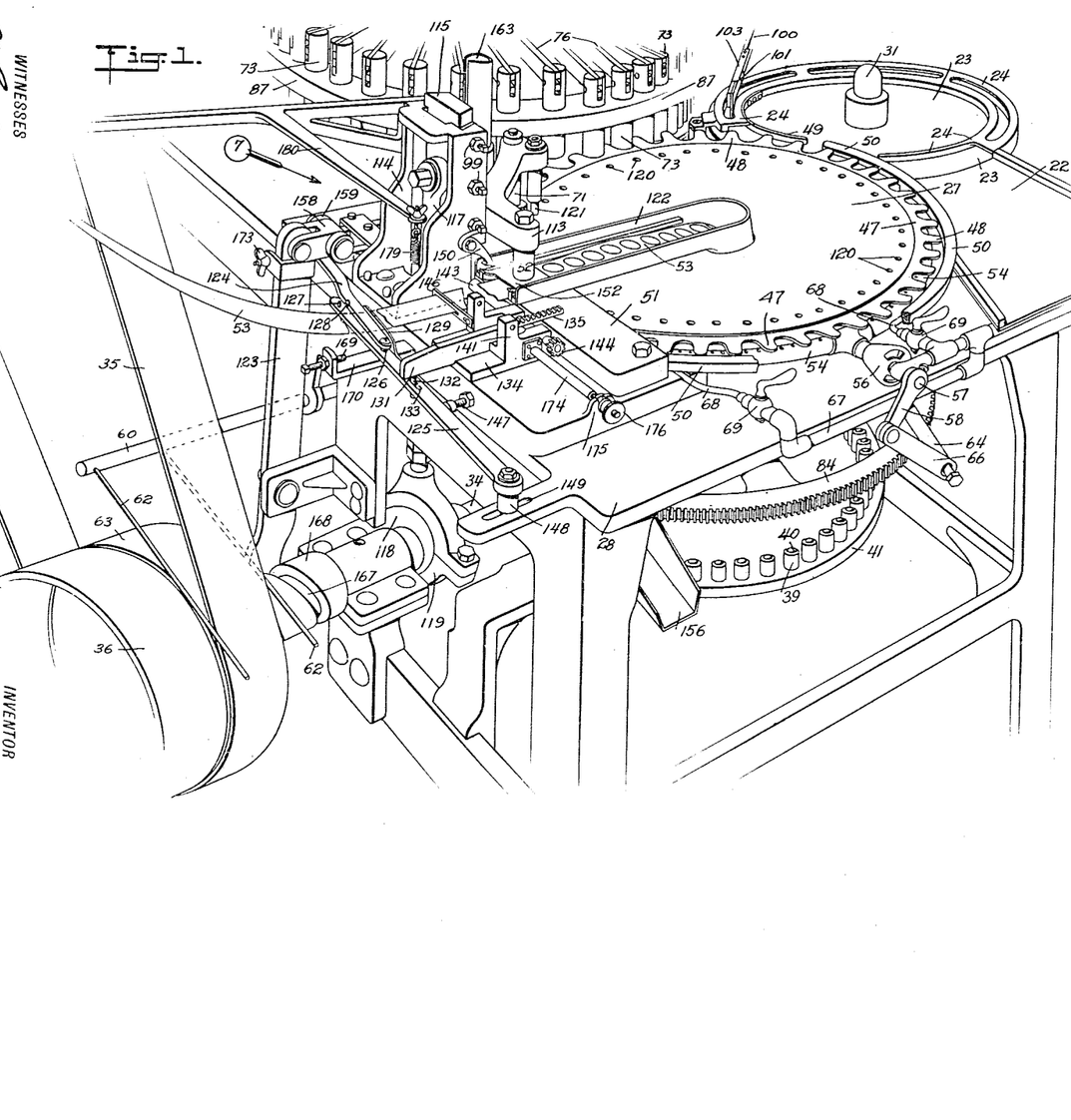
Figure 1 is a perspective view of the central portion of a machine constructed and arranged in accordance with the present invention.

As seen best in Fig. 1 of the drawings, the fingers 48 are spaced apart to form recesses conforming in shape to the caps 21. The position of the table 27 on the shaft 43 is such that the operation of the flange 37 on the rollers 39 and the disk 41 holds the fingers 48 relative the delivery end of the ring 24, so that the caps 21 are delivered by the table directly into one of the pockets formed by the fingers 48 (see Fig. 2 of the drawings).

The constant rotation of the table 23 and the intermittent rotation of the table 27 results in a precession in the operation of the table 23 to deliver the succeeding caps 21 to the fingers 48 in advance of each movement of the table 27.

To secure the adjustment of each cap within a pocket between the fingers 48, a leaf spring 49 is extended from the ring 24. The free end of said spring wipes the ends of the fingers 48, and when disposed therebetween each cap 21 as it passes the spring, is forced thereby into the pockets referred to. To maintain the caps within the pockets, a guard rail 50 extends circumjacent the table 27, and from the end of the spring 49 to a guide box 51 through a slot in which the caps are conveyed to pass under an orifice in the top of the box forming the female die through which a punch 52 delivers the disk which is cut away from a paper strip 53.

After the caps 21 are removed from the table 23, and before they are disposed below the punch 52, they travel above a gas heating tube 54. The tube 54 is shaped to conform with the rail 50, and is provided with a series of gas jet apertures 55 arranged to project upward to heat the caps 21 as the same are passed above the tube 54. The tube 54 is preferably formed in two sections, each section being joined to and extending from a coupling providing an air and gas mixing chamber 56 (see Figs. 1 and 2 of the drawings). The gas inlet to the chamber 56 is controlled by a threaded valve on a shaft 57, which in the present machine is rotated to open and close the valve, by means of a crank arm 58. The crank arm 58 is operatively connected with a belt-shifting lever 59, to be operated in unison therewith. The lever 59 is directly connected to the shift bar 60, being pivotally connected therewith by a pin 61. The shift bar 60, as seen in Fig. 1 of the drawings, is furnished with engaging rods 62, which straddle the belt 35, to lead it from a free-running pulley 63 to the fixed pulley 36 by which the shaft 34 is driven. The crank arm 58 is connected with the bar 60 by means of a swinging rod 64. The swinging rod 64 is pivotally mounted at 65 (see Figs. 2 and 3 of the drawings). The free end of the rod 64 is connected with the crank arm 58 by means of a link 66. Mounted on the gas supply pipe 67 are pilot-light tubes 68. The flow of gas through the tubes 68 is controlled by valves 69 of conventional construction.

From the foregoing it will be seen that when the operator throws the lever 59 to shift the belt 35 to the pulley 36, the gas control valve opening into the chamber 56 is opened, permitting the gas to flow into the branches of the tube 54, to be there ignited by the continuously-burning pilot flames at the ends of the tubes 68. Coincident with this ignition of the gas in the tube 54, the shaft 34 is driven to rotate continuously the table 23 and intermittently the table 27.

The caps 21 are moved thereby to travel from the feed table 22 to the delivery table 23 to the pockets between the fingers 48 on the table 27, and to be carried by said pockets over the length of the tube 54, to be heated by the flame of the burning gas emanating therefrom, each cap in its turn after having been thus heated, being delivered below the punch 52 to receive the disk of cement-impregnated paper cut from the strip 53, and having received said disk, to be moved to the delivery station for cork pads 70 below a plunger 71, where one of said pads is delivered to the cap to rest upon the paper disk previously deposited therein.

Without pausing to describe the mechanism for feeding the paper strip 53 or the cork pads 70, it is deemed wise to continue the description of the operation of the machine to complete the setting of the pads and the delivery of the caps. From the position below the plunger 71, the caps are moved until arriving at a point approximately on line between the centers of the supporting table 27 and the transfer table 72. At this point, tamping plungers 73 are depressed upon the pad 70 which has been placed in the cap, to press said paper disk and cap firmly upon the table 72. To this end, the undulatory edge of the cylinder 74 is cut away to permit springs 75 to lift each lever 76 and to depress each tamping plunger 73 at this point. The succeeding cam surfaces of the cylinder 74 are so disposed that when they bear on the roller 77 at the end of each lever 76 downward to lift the plungers 73 away from the pad 70, the cap 21 with which each of said plungers 73 is engaged has been moved out from between the fingers 48, to thereafter remain on the transfer table 72. With the transfer herein described in view, the tables 27 and 72 are juxtaposed so that the fingers 48 rest lightly above the rim of the table 72, and when the caps 21 are moved by said fingers over said transfer table 72, they rest lightly on the surface of said transfer table.

In the subsequent travel of the caps, after being delivered to the transfer table 72, the plungers 73 are raised and lowered by the operation of the cam surfaces of the edge 78 of the cylinder 74. When lifted, during the travel of the caps on the table 72, the plungers 73 are not removed from said caps, which are thereby prevented from escaping. When permitted by the cam surfaces, the springs 75 rock the lever 76 to press the plungers 73 upon the pads, disks and caps. When in the rotation of the table 72, the rollers 77 are brought under a cam rise 79, the levers 76 are rotated to lift the plunger 73 out of the hollow of the caps 21, permitting the same to be delivered from the table 72.

Figure 7:
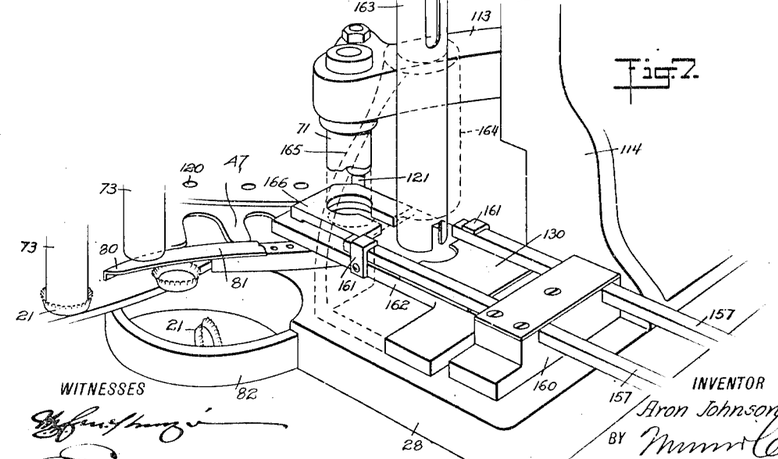
Fig. 7 is a detail view on an enlarged scale, showing in perspective the parts enumerated as in Fig. 6, together with a supporting structure therefor, and fragments of the transfer table, tamping plungers, and the extractor for delivering completed caps, the view being taken from the direction indicated by the arrow marked 7 in Fig. 1 of the drawings.
Figure 8:
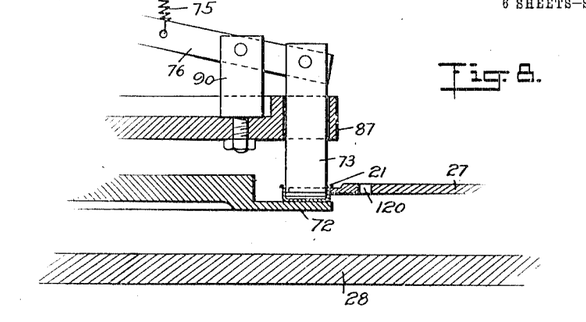
Fig. 8 is a detail view, on an enlarged scale, showing in vertical section a cap and fragments of the supporting table therefor, the transfer table, a tamping plunger, operating lever and pivotal support therefor, the section being taken as on the line 8—8 in Fig. 2.
Figure 9:
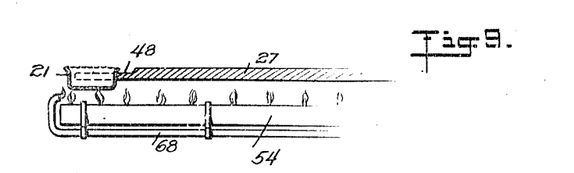
Fig. 9 is a detail view on an enlarged scale, showing in vertical section a cap and fragment of the supporting table and the cap heater.

The delivery of the caps 21 from the table 72 is effected by an extractor 80, definitely mounted on the platform 28 of the machine. The plungers 73 are lifted to pass over the extractor 80 and the top 81 thereof. The caps 21, as delivered, pass through a ring 82, shown in Fig. 7 of the drawings, into a chute 83, by which the finished caps are guided to a packing or delivery station exterior to the machine.

The movements of the tables 72 and 27 are synchronized, so that at the point of tangency of the circular paths of the centers of the pockets formed by the fingers 48, and of the plungers 73, the movement of the plungers and pockets, and the caps contained in said pockets, harmonize or correspond. The synchronization referred to is secured by employing large gear wheels 84 and 85, the former of which is fixedly mounted on the tubular shaft 43, the latter being fixedly mounted on a shaft 86.

The table 72 is keyed to the shaft 86, and it will be remembered the shaft 43 is operatively connected with the driving shaft 34 through the intermediary of the disk 41 and the pintle rollers 39. Therefore, when in the operation of the machine the shaft 43 and parts connected therewith are moved with the intermittency described, the table 72 and parts connected therewith have imparted thereto a similar movement.

The parts referred to as connected with the table 72 are primarily the plate 87 and the turret 88. The plate 87 may be integrally formed with the table 72, though I prefer to construct it separately, and to secure it to the said table by means of pins 89, as seen in Fig. 3 of the drawings. The plate 87 forms the support for pivot stands 90, one of which is furnished for each of the levers 76. The plate 87 is provided adjacent the periphery thereof with guide perforations for the plungers 73. The turret 88 is rigidly bolted to the plate 87, the side walls of the turret having a series of slots 91 formed therein, said slots corresponding each with one of the stands 90 and serving as a guide for the lever 76 extending therethrough. At the upper edge of the turret 88, an annular flange 92 is extended to form an anchorage for screw bolts 93, to each of which is attached one of the springs 75. The bolts 93 are engaged directly by wing nuts 94. By manipulating the nuts 94, it is obvious the tension of the springs 75 may be varied.

The cylinder 74 is non-rotatively mounted within the turret 88, and is supported by a slide bar 95 movably mounted in the head 96 of a bracket 97. The bracket 97 is secured to the platform 28 of the machine (see Figs. 2 and 3 of the drawings). The head 96 is provided with a vertical undercut slot, wherein the bar 95 is moved by a feed screw 98. Coöperating with the screw 98, set screws 99 hold the bar 95 and cylinder 74 connected therewith rigidly in adjusted position.

It has been described how the cam-shaped edge 78 of the cylinder 74 operates to depress the inner ends of the levers 76 and to litf the plungers 73 connected therewith, each of the springs 75 being connected with one of said levers to hold the free end thereof and the roller 77 with which it is provided, against the cam surface. The strength of the springs 75 is sufficient to force the plungers 73 hard upon the pad 70 in each cap 21. The result of the operation of the numerous cam surfaces formed on the edge 78 is to tamp or successively strike the pad in each cap as the cap moves from the point of delivery from the table 27 to the extractor 80. In this manner, provision is made for imparting the necessary pressure to the pad while the paper disk is softened by the heat of the cap 21, and to permit the escape of any gases, vapor or steam generated incident to the operation. The table 72 operates to cool the caps 21, which effect is augmented by the lift of the plungers 73 in the manner described, inciting thereby a circulation of air within said caps. The consequent burning of the paper disks, and the disintegration of the cork pads above referred to, are thereby avoided.

Figure 10:
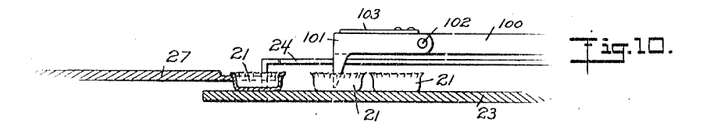
Fig. 10 is a detail view on an enlarged scale, showing in vertical section a cap, the supporting and delivering tables therefor, and in elevation caps of similar construction and the end fragment of a detent for arresting the feed of the caps to the supporting table, the section being taken on the line 10—10 in Fig. 2.
Figures 11, 12:
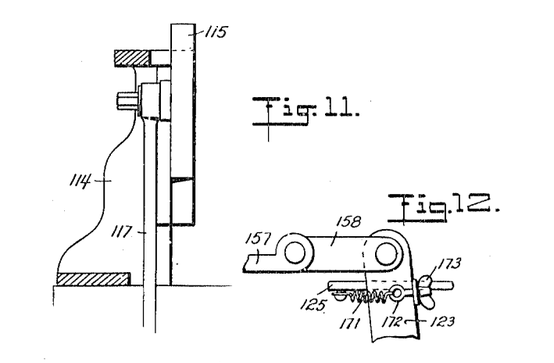

To prevent the too rapid feed of the caps 21 by the table 23, which operation might result in the jamming of the caps between the ends of the fingers 48 and the spring 49, with resultant damage either to the caps or spring, I provide a lever arm 100, at the end whereof a detent hook 101 is pivotally mounted by means of a pin 102. To hold the point of the hook 101 within the caps 21, a spring 103 is secured to the arm 100, to overlie the edge of the hook 101, as seen best in Fig. 10 of the drawings.

Figure 4:
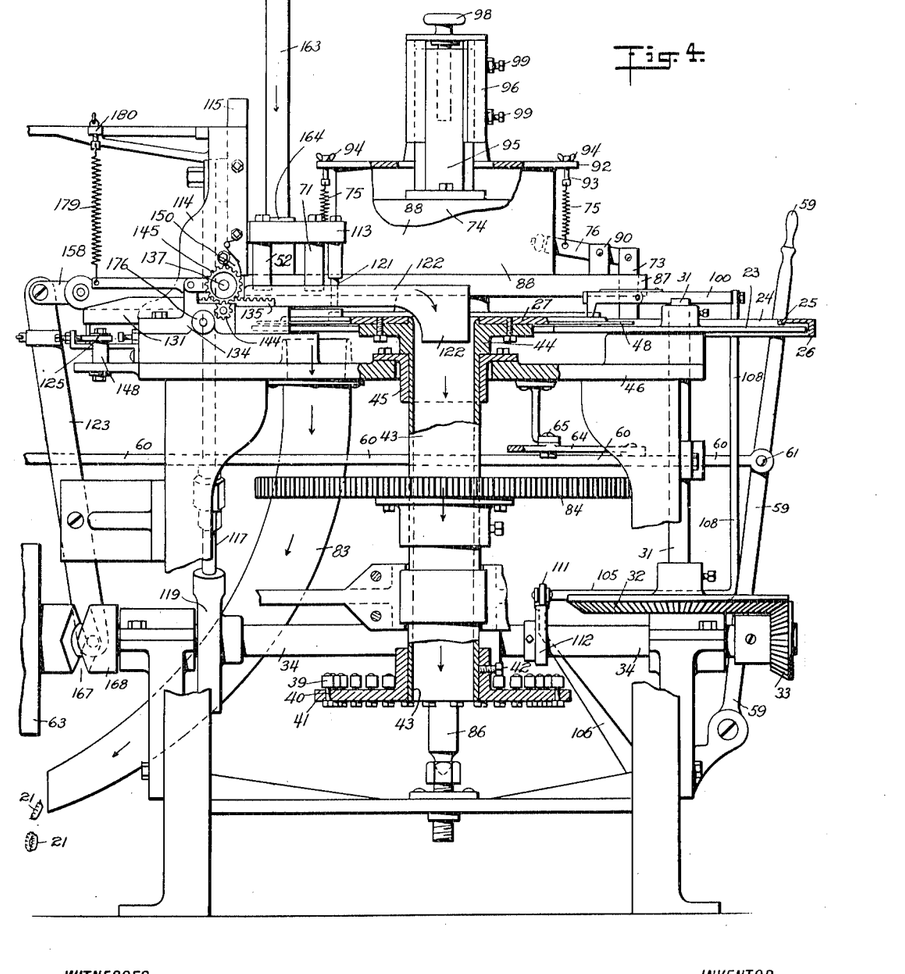
Fig. 4 is a side elevation partly cut away to show the interior construction, the view being taken from the position as indicated by the arrow marked 4 in Fig. 2.
Figure 5:
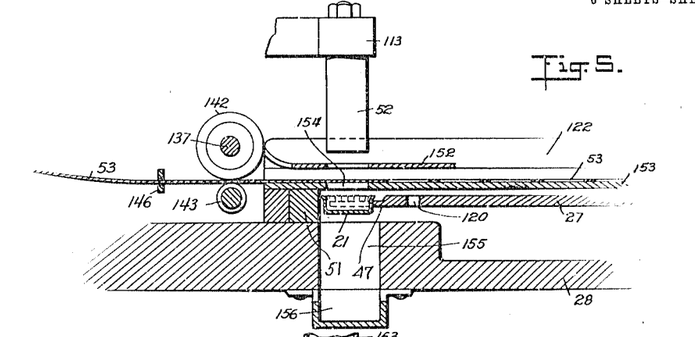
Fig. 5 is a detail view, on an enlarged scale, showing in vertical section fragments of a bottle cap, supporting table, an adhesive-paper supply and punch therefor, the section being taken on the line 5—5 in Fig. 2.

The lever arm 100 is pivoted in a stand 104 raised from the platform 28 (see Fig. 2 of the drawings). The lever arm 100 is rocked by a lever 105, which is pivoted on a standard 106 by means of a pivot pin 107, said standard being shown in Figs. 3 and 4 of the drawings as disposed below the platform 28. The upright arm of the lever 105 is pivotally connected to the lever arm 100 by means of a link rod 108 and a bolt 110 which is mounted in an elongated slot 109 provided in the end of the lever arm 100. By means of this connection between the end of the lever 105 and the lever arm 100, the lift of the end of said arm provided with the hook 101 may be varied to suit the conditions of operation, as when padding caps the flanges whereof are longer or shorter, as the case may be. The opposite end of the lever 105, as shown in Fig. 4 of the drawings, is provided with a wiping roller 111, provided to ride the edge of a heart-shaped cam 112. The cam 112 is fixedly mounted on the shaft 34, to be operated coincident with each revolution thereof.

The arm 100 and mechanism connected therewith are set to operate to lift the hook-bearing end of said arm during the intermission of movement of the table 27. As explained, the delivery table 23 moves constantly, and therefore is in condition to place the next succeeding cap 21 in the pocket between the fingers 48 disposed to receive the same. The peak of the cam 112 is shaped to secure a duration of the lift of the hook 101 corresponding to the passage of the column of caps 21, from center to center of said caps; or in other words, when the column of caps on the table 23 has moved a distance equal to the distance between the centers of adjacent caps, the arm 100 rocks to its holding position, placing the hook 101 within the next succeeding cap, to retain the same and the column of caps at the rear thereof, while the freed cap passes into the pocket formed by the waiting fingers 48, 48. If, in the forward movement of the column of caps on the table 23, the flanges of the caps strike the hook 101, the inclined rearward surface of the hook operates to lift the same over said flanges, the spring 103 yielding to permit this.

In review of the mechanism thus far described, it will be seen that in a unit machine, the metal caps are fed continuously to a carrier, or supporting table, to be exposed to the influence of a heater, to be then supplied with a disk of adhesive paper and a pad or disk of cork or other suitable material, prior to delivery to a presser member, which manipulates the pad-loaded cap by a succession of blows imparted thereto prior to delivery thereof. And, it will be seen that by heating the caps prior to the insertion therein of the adhesive disk or pad, the burning or damage to the disks or cork pads, previously referred to, is avoided.

The disk cut from the strip 53, and each of the pads 70 are delivered to different caps 21 simultaneously and during the rest of the table 27. To this end, the punch 52 and the plunger 71 are both mounted on the reciprocating head 113. The head 113 is slidably mounted in an undercut groove formed in the face of a stand 114, which stand is rigidly mounted upon the platform 28 of the machine. The undercut slot formed in the stand serves as a guide for a slide block 115 forming an integral part of the head 113. The slide block 115 is pivotally connected by a pin 116, with a pitman rod 117, by which said block is operatively connected with the driving shaft 34 and an eccentric wheel 118 thereon, a collar 119 being employed for this connection.

Figure 6:
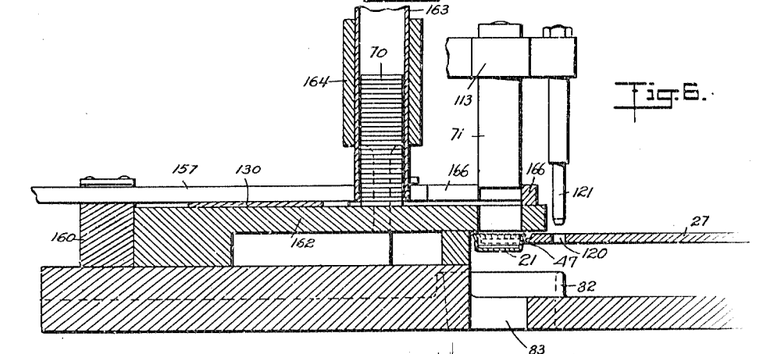
Fig. 6 is a detail view, on an enlarged scale, showing in vertical section fragments of a bottle cap, a supporting table therefor, a magazine tube for cork pads, members of the delivery mechanism therefor, and a pin for registering the supporting table, the section being taken on the line 6—6 in Fig. 2.

To secure registration of the table 27 with the punch 52 and plunger 71, said table is furnished with a series of holes 120 to receive a pin 121, the end whereof is tapered to enter the holes, and if necessary to shift the table in correction of the alinement thereof with said punch and plunger. The pin 121, as best seen in Fig. 6 of the drawings, is elongated to enter holes 120 in advance of the action of said punch and plunger, thereby securing the registration of the table 27 prior to the delivery of the paper disk and cork pad to the caps carried thereby.

The paper strip 53 is fed from a supply outside of the machine, to the center of the table 27, being guided therein by a chute 122, to be delivered to the interior of the tubular shaft 43 and therefrom to a station outside of the machine. The feed of the paper is synchronized with the operation of the head 113, and with the feed of the successive cork pads 70, being for this purpose connected with a lever 123 by means of a connecting bar 124 and a link bar 125.

The bars 124 and 125 are pivotally connected by a pin 126, and are converted to a stiff arm by a pin 127 when moved outward from the center of the machine, a nick 128 being formed in the edge of the bar 124 to engage said pin 127. In the forward action of the united bars 124 and 125, they are permitted by a spring 129 to brake, thus allowing for a relative independence in extent of action of the lever 123 and parts connected therewith and the bar 125 and the parts connected therewith. This construction is necessitated by the variation in the feed of the strip 53 relative to the travel of the free end of the lever 123 and the plunger plate 130 connected therewith.

The outward throw of the link bar 125 is regulated by a set screw 169, which is mounted on the upturned end of a bracket bar 170. The link bar 125 is connected to the lever 123 by means of a spring 171. The spring 171 is anchored to a screw bolt 172, which is provided with a wing nut 173. When, by the adjustment of the screw 169, the outward throw of the link bar 125 is limited to be arrested prior to the finish of the outward stroke of the beater lever 123, the spring 171 yields to permit the variation in play or movement of said link bar and lever.

The link bar 125 is connected to a slide 131 by means of a pin 132, which extends through a slot 133 formed in said link bar. The slide 131 is mounted in a runway in a guide block 134, and is provided at the inner end with a rack bar 135, the teeth whereof normally engage a pinion 136 (see Fig. 2 of the drawings). The pinion 136 is loosely mounted on a short shaft 137, to freely rotate therewith. Rigidly mounted on the pinion 136 is a clutch member 138, the teeth whereof are adapted to engage the longitudinally fixed clutch member 139 which loosely engages the shaft 137. Toward the fixed clutch member 139, the loose clutch member 138 is normally moved by a spring 140, which bears against the adjacent sides of the pinion 136 and the side of one of the yoke arms 177, which arms are pivotally mounted in bearings formed in the brackets 141 erected on the block 134, to form a bearing for the shaft 137. The opposite end of the shaft 137 is reduced to form a pintle to enter a socket formed in the clutch member 139 and the shaft connected therewith supporting a friction feed wheel 142, under which and in contact with which the strip 53 passes, to enter the chute 122.

The strip 53 is supported in contact with the wheel 142 by a feed roller 143 (see Fig. 1 of the drawings). The roller 143 is provided with a shaft mounted in bearings in the block 134, and provided at the outer end with a pinion 144 (see Figs. 1 and 4 of the drawings). The pinion 144 is meshed with a gear wheel 145 with which the shaft 137 is provided. The wheel 145 and pinion 144 correspond in proportion to the wheel 142 and roller 143, thereby securing uniformity of peripheral speed of said wheel and roller. The paper is guided to said wheel and roller by a paper-guide 146.

From the foregoing, it will be seen that the peripheral travel of the wheel 142 and roller 143 is proportioned to the extent of movement of the slide 131 and link bar 125 connected therewith. It is to regulate the forward travel of the link bar that I provide a stop screw 147. The screw 147 is suitably mounted in the platform 28 of the machine. It will be seen that as the screw 147 is manipulated, the throw of the link bar 125 is increased or diminished, and that when so diminished, the spring 129 yields to permit the necessary independent movement of the connecting bar 124 in conformity with the action of the lever 123. The movement of the link bar 125 is regulated in practice by the adjustment of the pivot block 148 in the slot 149 shown as formed in a projecting portion of the platform 28 of the machine.

When, in the operation, the slide 131 is drawn back, the wheel 142 and shaft connected therewith are held from reverse rotation by a swinging pawl 150, the hook end whereof engages and holds a ratchet wheel 151 (see Fig. 2 of the drawings).

To facilitate the introduction of the paper strip 53, the wheel 142 is lifted by rocking upward the yoke arms 177. The yoke arms 177 are united to form a tailpiece 178, which is normally lifted by a spiral spring 179, the upper end whereof is supported by a bracket arm 180. When the tailpiece 178 is depressed, the yoke arm 177, the shaft 137, the wheels 142 and 145, and the pinion 136 are lifted free of their respective engagements.

The paper, after leaving the wheel 142 and roller 143, passes between a guard plate 152 and a bed plate 153 forming the bottom of the chute 122. The bed plate 153 is provided with a round die opening 154 to coöperate with the punch 52, in cutting the disk from the strip 53.

The guide block 134 is pivotally connected with the platform 28 at the outer side of the brackets 141 and the shaft 137 therein mounted. The pivotal connection thus made is employed to shift the block 134 and parts connected therewith to adjust the feed of the strip 53 in the chute 122. This shift is accomplished by means of an elongated feed screw 174, which is thread-engaged by a nut wheel 176 which is pivotally mounted in lugs 175 at the edge of the raised portion of the platform 28 carrying said guide block 134. It will be understood that by manipulating the wheel 176, the block can be shifted to change the direction of travel of the strip 53 when leaving the wheel 142 and roller 143.

In the platform 28, directly below the opening 154, a passage 155 is formed to deliver the disks to a chute 156 provided to convey the disks beyond the machine when caps 21 are not in position to receive the disks. The perforated section of the paper strip 53 is conveyed through the chute 122 and tubular shaft 43, as shown in Fig. 1 of the drawings.

The lever 123 is connected with the plunger plate 130 by rods 157, to which said plate is rigidly secured. The rods 157 are pivotally connected at their outer ends to a link block 158 by means of a pin 159. Said rods are guided in grooves formed in a block 160 and by clips 161, which are rigidly secured to a slide plate 162, over which the plunger plate 130 slides when passing under a tube 163 provided as a magazine for the pads 70. The tube 163 is supported in a socket collar 164 of a bracket 165. A plate 166 is rigidly mounted on the slide plate 162, the body of said plate being raised from the slide plate to permit the plunger plate 130 to pass thereunder.

Suitable alined orifices are formed in the plates 162 and 166, to permit the passage therethrough of the plunger 71. The rods 157 are extended inward beyond the plate 130 to slide upon the edge of the plate 166, to be guided thereby.

To the link block 158, the free end of the lever 123 is connected. The opposite end of said lever is operatively engaged by a cam groove 167 formed in a cam block 168 with which the shaft 34 is provided.

The arranged of the cam groove 167 and the eccentric wheel 118 is such as to secure the proper synchronization of the operation of the head 113 with the paper-feeding mechanism and the pad-feeding mechanism.

Having thus described my invention, I claim as new and desire to secure by Letters Patent:—

1. In a machine of the class mentioned, having means for holding metal caps of the character specified and for supplying the same with a paper disk and a yielding pad in the order named, and for holding said caps to melt the adhesive preliminary to the introduction of the disk and pad; a rotary conveyer table to receive said caps when supplied with pad and disk; a plurality of plungers mounted upon said table to move therewith; a plurality of rocking levers, said levers being each operatively connected with one of said plungers; and a cylinder having a series of dependent cams formed thereon to rock said levers consecutively to raise and lower said plungers, to perform a series of operations intermediate the receiving and delivery stations of said table.

2. A machine as characterized, comprising means for automatically heating metal caps and for supplying the same while warm with adhesive collets and resilient pads, said collets being interposed between said pads and said caps; a delivery table arranged to receive said caps when supplied in the manner mentioned; a pressing mechanism mounted on said table and embodying a plunger adapted to enter said caps to press said collets; and means for successively lifting said plunger from said collets for permitting the escape of moisture from said caps.

3. A machine as characterized, comprising means for automatically heating metal caps and for supplying the same while heated, with adhesive collets and resilient pads, said collets being interposed between said pads and said caps; a delivery table arranged to receive said caps when supplied in the manner mentioned; a pressing mechanism mounted on said table and embodying a plunger adapted to enter said caps to press said collets; and a series of cams disposed in the path of said plungers to intermittently lift the same.

4. A machine as characterized, comprising means for automatically heating metal caps and for supplying the same while heated, with adhesive collets and resilient pads, said collects being interposed between said pads and said caps; a delivery table arranged to receive said caps when supplied in the manner mentioned; a pressing mechanism mounted on said table and embodying a plunger adapted to enter said caps to press said collets; a series of cams disposed in the path of said plunger to intermittently lift the same; and means for depressing said plunger to provide an even pressure thereof on said pads.

5. A machine as characterized, having a cap-supporting table provided with peripherally-disposed cap-holding means, said table having a central opening; means for feeding an adhesive strip radially across said table above said cap-holding means; guides for said strip, embodying said central opening, for the delivery of said strip from said machine; and punches for cutting collets from said strip and for delivering said collets to the caps during the feed of said strip across said supporting table.

In testimony whereof I have signed my name to this specification in the presence of two subscribing witnesses.

ARON JOHNSON.

Witnesses:
E. F. MURDOCK,
PHILIP D. ROLLHAUS.